C. G. CARLBERG.
SHAFT LOCKING MEANS FOR DIFFERENTIAL GEARS.
APPLICATION FILED JUNE 4, 1920.

1,361,963. Patented Dec. 14, 1920.

Inventor

Carl G. Carlberg,
Hiram A. Sturges,
Attorney

UNITED STATES PATENT OFFICE.

CARL G. CARLBERG, OF OMAHA, NEBRASKA.

SHAFT-LOCKING MEANS FOR DIFFERENTIAL GEARS.

1,361,963. Specification of Letters Patent. Patented Dec. 14, 1920.

Application filed June 4, 1920. Serial No. 386,513.

*To all whom it may concern:*

Be it known that I, CARL G. CARLBERG, a citizen of the United States, residing at Omaha, in the county of Douglas and State of Nebraska, have invented certain new and useful Improvements in Shaft-Locking Means for Differential Gears, of which the following is a specification.

This invention relates to shaft-locking means for differential gears, and has for its object, broadly, to provide an emergency device for automobiles or other motor driven vehicles, to cause uniform rotation of the rear wheels, said device being useful when driving upon slippery inclines to prevent "spinning" of one of the driven vehicle wheels when seated in soft ground or upon ice, the other driven vehicle wheel being upon solid ground.

With the foregoing objects in view the invention presents a novel construction, combination and arrangement of parts as described herein and claimed, and as illustrated in the accompanying drawing, wherein,—

Figure 1:
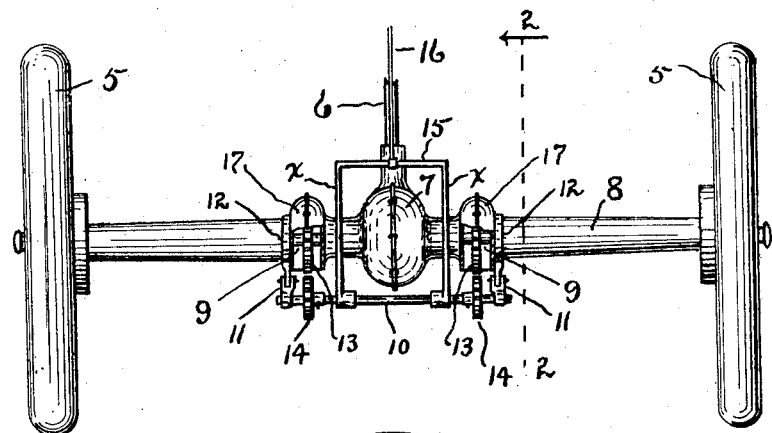
Figure 2:
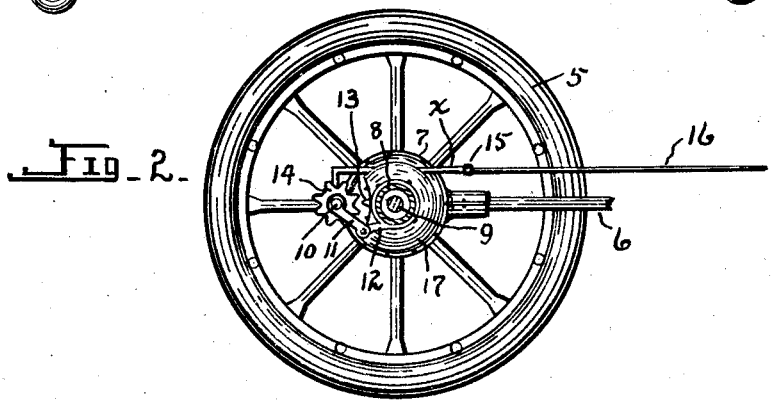
Figure 3:
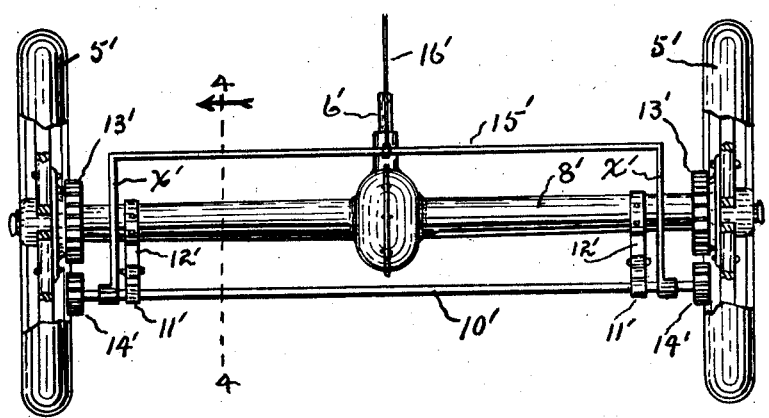
Figure 4:
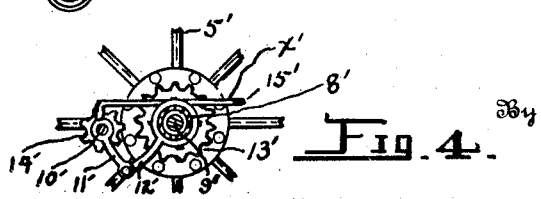

Figure 1 is a plan view of a pair of vehicle wheels driven by the shafts of a differential gear, showing locking means adapted to be applied to the shafts, parts being broken away and in section. Fig. 2 is a transverse section on line 2—2 of Fig. 1. Figs. 3 and 4 illustrate a modified form of the invention. Fig. 3 is a plan view showing the locking means adapted to be applied to the vehicle wheels. Fig. 4 is a sectional view on line 4—4 of Fig. 3, broken away and showing one of the shafts of the differential gear, the tubular axle and locking means.

Referring now to the drawing, the invention is shown and described in connection with the pair of rear wheels 5, a revoluble shaft 6 for operating a differential gear which is disposed in the conventional gear-housing 7 of the tubular axle 8 of a motor driven vehicle, the pair of shafts within the tube 8 and driven by the differential gear, being indicated at 9.

In the present instance the differential gear is not shown or described since the device is operative, in case of emergency, for causing uniform rotation of the shafts 9 of any differential gear.

In order that an automobile or other motor driven vehicle will not become stalled when one of the wheels driven by the shaft of a differential gear enters mud or soft ground, and that spinning of the wheel may be prevented, I provide any suitable means for locking the shafts 9 of the differential gear in connected relation, said means as shown in Figs. 1 and 2 consisting, in part, of a shaft 10 disposed approximately parallel with shafts 9 and having journaled bearing, near its ends, in a pair of links 11, the latter being pivotally mounted upon a pair of hangers 12 which are secured to member 8, each shaft 9 of the differential gear being provided with a gear wheel 13 adapted to be engaged by a gear wheel 14 of the shaft 10; and it will be understood that if the last named shaft is swung toward the axle 8, the wheels 14 will engage the wheels 13 to cause the revoluble movement of one of the shafts 9 to be communicated to the other shaft 9, and since, as is well known, the rear wheels are keyed on the shafts 9, spinning of either vehicle wheel will be prevented.

Any suitable means may be provided to be under control of an operator for causing engagement or disengagement of the wheels 14 with the wheels 13, the means herein shown being a yoke 15 having its arms *x* loosely mounted upon the shaft 10, said yoke being provided with a pull-and-push rod 16 which may be moved for the purposes described, the wheels 14 normally being disengaged from the wheels 13, and in a case of emergency, the rod 16 and yoke may be moved forwardly for locking the shafts 9. Numerals 17 indicate enlarged parts of the casing 8 for receiving the wheels 13, these being provided with openings to permit engagement of the wheels 14 with the wheels 13, when the yoke and shaft 10 are swung forwardly.

In Figs. 3 and 4, it will be understood that the vehicle wheels 5' are rotated by the shafts 9' of a differential gear, the same as described, said differential gear being actuated by a driven shaft 6'. I have shown each rear wheel 5' to be provided with a gear wheel 13', and upon the tubular axle 8' are secured a pair of hangers 12' to provide pivotal mountings for the pair of links 11', said links providing journaled bearings for the shaft 10', the latter being provided with a pair of gear wheels 14', and it will be understood that by means of the pull-and-push rod 16' the yoke 15' may be drawn forwardly for causing engagement of the gear wheels 14' with the gear wheels 13', the arms $x'$ being loosely mounted on the shaft 10', the result in operation being that a revoluble movement imparted to one of the vehicle wheels 5' will be communicated to the other wheel 5'.

It will be seen that the only difference shown in the modified form of the invention is that the gear wheels 13 are mounted stationary with the vehicle wheels 5' revolved by the shafts of the differential gear while, in the embodiment of the invention shown in Figs. 1 and 2, the gear wheels 13 are mounted stationary with the shafts 9 of the differential gear, the result in either instance being that the shafts of the differential gear may be locked in connected relation, whenever required, and therefore it is considered that the modified form is within the scope of the invention.

It will be understood that various changes in form, size, proportion, minor details of construction and rearrangement of parts may be made, as hereafter found to be of advantage, said changes to be within the scope of the invention as claimed.

What I claim as new and desire to secure by Letters Patent is,—

1. In combination with a pair of revoluble shafts, a pair of gear wheels each being movable with one of said shafts, a third shaft provided with gear wheels, and a pull-and-push-rod connected with said third shaft for causing engagement or disengagement of its gear wheels with said first named gear wheels.

2. In combination with a tubular axle, a pair of revoluble shafts therein, a pair of gear wheels each being movable with one of said revoluble shafts, hangers on the axle, links pivotally mounted on the hangers, a third shaft provided with gear wheels and journaled on the links, and means for moving the third shaft to cause engagement of its gear wheels with said first named gear wheels.

3. The combination with a tubular vehicle axle, a differential gear, and a pair of shafts in the axle arranged to be rotated by the differential gear, of a pair of gear wheels each being movable with one of said shafts, hangers stationary with the axle, links pivotally mounted on the hangers, a third shaft provided with a pair of gear wheels and journaled in the links, and means for moving the links and third shaft for engagement of its gear wheels with the first named gear wheels to prevent an unequal degree of speed in the revoluble movements of the shafts of said differential gear.

In testimony whereof, I have affixed my signature in presence of two witnesses.

CARL G. CARLBERG.

Witnesses:
HIRAM A. STURGES,
ARTHUR H. STURGES.